United States Patent
Yamada et al.

(10) Patent No.: US 8,130,613 B2
(45) Date of Patent: Mar. 6, 2012

(54) OPTICAL DISC APPARATUS AND REPRODUCTION CONTROL METHOD

(75) Inventors: Atsushi Yamada, Saitama (JP); Tooru Kawashima, Mito (JP); Mitsuhiro Nishidate, Sagamihara (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 212 days.

(21) Appl. No.: 12/430,963

(22) Filed: Apr. 28, 2009

(65) Prior Publication Data
US 2009/0303845 A1 Dec. 10, 2009

(30) Foreign Application Priority Data
Jun. 6, 2008 (JP) .................. 2008-148982

(51) Int. Cl.
*G11B 7/00* (2006.01)
(52) U.S. Cl. ............... 369/53.17; 369/53.32; 369/47.18; 369/47.27
(58) Field of Classification Search ............... 369/30.04, 369/44.32, 47.14, 47.17, 47.18, 47.27, 53.12, 369/53.15, 53.16, 53.17, 53.24, 53.32
See application file for complete search history.

(56) References Cited

U.S. PATENT DOCUMENTS

| | | | |
|---|---|---|---|
| 5,715,355 A * | 2/1998 | Yonemitsu et al. | 386/243 |
| 6,389,569 B1 | 5/2002 | Chung et al. | |
| 7,221,631 B2 * | 5/2007 | Park et al. | 369/53.12 |
| 7,420,900 B2 * | 9/2008 | Ueda et al. | 369/47.14 |
| 7,558,163 B2 * | 7/2009 | Park et al. | 369/44.14 |
| 2001/0046191 A1 * | 11/2001 | Imada et al. | 369/47.14 |
| 2004/0136304 A1 * | 7/2004 | Chung et al. | 369/53.37 |
| 2005/0022053 A1 * | 1/2005 | Park et al. | 714/7 |
| 2005/0099906 A1 * | 5/2005 | Takahashi | 369/47.18 |

FOREIGN PATENT DOCUMENTS

JP 2001-320663 11/2001

* cited by examiner

*Primary Examiner* — Mohammad Ghayour
*Assistant Examiner* — Thomas Alunkal
(74) *Attorney, Agent, or Firm* — Antonelli, Terry, Stout & Kraus, LLP.

(57) ABSTRACT

The present invention makes it possible to reproduce reproduction images without a break without having to use any additional identification information even when real-time recorded data is not completely continuous. A control circuit references a data identification flag ("Recording Type") which is attached to each sector of reproduction data to indicate the type of recorded data, and counts the number of sectors to which the data identification flag representing real-time recorded data is attached. When the count is not smaller than a threshold value, the control circuit reproduces all the sectors of the target reproduction block in a real-time reproduction mode. In the real-time reproduction mode, the control circuit masks a portion of reproduction data that is found to be defective, changes the value of the defective data to 0 (zero), and transfers the resulting reproduction data to a host device.

9 Claims, 5 Drawing Sheets

FIG. 3A
EXAMPLE OF DISCONTINUOUS RECORDING

FIG. 3B
CONVENTIONAL REPRODUCTION

FIG. 3C
REPRODUCTION ACCORDING TO EMBODIMENT OF PRESENT INVENTION

FIG. 4

OPTICAL DISC APPARATUS AND REPRODUCTION CONTROL METHOD

CLAIM OF PRIORITY

The present application claims priority from Japanese patent application serial No. JP 2008-148982, filed on Jun. 6, 2008, the content of which is hereby incorporated by reference into this application.

BACKGROUND OF THE INVENTION

1. Field of the Invention

The present invention relates to an optical disc apparatus for reproducing real-time recorded data on an optical disc in a suitable manner, and also relates to a reproduction control method.

2. Description of the Related Art

If a read error occurs when an attempt is made to record or reproduce normal data within an optical disc apparatus, a retry is performed to repair read data for reliability enhancement purposes. On the other hand, when an attempt is made to reproduce a moving image or other stream data to be recorded or reproduced in real time (hereinafter referred to as real-time recorded data), a real-time reproduction (or stream reproduction) process is conducted without performing a retry. More specifically, even if a read error occurs during real-time reproduction, the affected data is output without running an error check to process the next data because image continuity takes precedence over data reliability. As this assures the temporal continuity of image data, a viewer does not feel uncomfortable.

When an optical disc apparatus reproduces data from an optical disc, it determines in accordance with the type of recorded data whether it should perform a normal reproduction process or a real-time reproduction process. To achieve such a purpose, information indicating the type of data is attached to the data to be recorded. A method of attaching the information representing real-time recorded data to each file and performing a real-time reproduction process in accordance with the attached information is described, for instance, in JP-A-2001-320663.

SUMMARY OF THE INVENTION

In an actual recording process, a series of real-time recorded data may be unexpectedly discontinuous. More specifically, when an overwrite is performed to avoid a recording error portion, real-time recorded data and normal recorded data may coexist. When such discontinuously recorded data is reproduced in a normal manner, a read error occurs so that a retry is performed. Therefore, the resulting reproduced image is not continuous (that is, an image reproduction process is interrupted and resumed or is stopped).

The technology disclosed in JP-A-2001-320663 performs a real-time reproduction process on an individual file basis by recording file-specific identification information indicative of real-time recording. Therefore, even if the data in a file is not continuous, the reproduced image is continuous. However, when the technology disclosed in JP-A-2001-320663 is used, the employed recorder must attach the identification information indicative of real-time recording to each file. It means that both the recorder and player must be capable of handling such additional identification information.

An object of the present invention is to provide an optical disc apparatus that is capable of reproducing reproduction images continuously without having to use any additional identification information even when real-time recorded data is not completely continuous. Another object of the present invention is to provide a reproduction control method that achieves the above-mentioned purpose.

According to one aspect of the present invention, there is provided an optical disc apparatus that reproduces real-time recorded data on an optical disc, the optical disc apparatus including: a spindle motor which rotates the optical disc; an optical head which irradiates the optical disc with a laser beam to read recorded data; a reproduction process circuit which processes a signal from the optical head to generate reproduction data; a defect detection circuit which detects a defect in the reproduction data; and a control circuit which references a data identification flag indicative of the type of recorded data, which is attached to each sector of the reproduction data, controls a reproduction operation, and transfers the reproduction data to a host device. The control circuit accesses a target reproduction block to count the number of sectors to which the data identification flag representing real-time recorded data is attached. When the count is not smaller than a threshold value, the control circuit reproduces all the sectors of the target reproduction block in a real-time reproduction mode.

According to another aspect of the present invention, there is provided a reproduction control method for reproducing real-time recorded data on an optical disc, the reproduction control method including the steps of: referencing a data identification flag indicative of the type of recorded data, which is attached to each sector of reproduction data; accessing a target reproduction block to count the number of sectors to which the data identification flag representing real-time recorded data is attached; and, when the count is not smaller than a threshold value, reproducing all the sectors of the target reproduction block in a real-time reproduction mode.

The present invention makes it possible to reproduce reproduction images continuously even when real-time recorded data and normal recorded data coexist. As standardized data identification information is used to achieve such a purpose, the present invention offers a high degree of practicality without having to use any additional identification information.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Figure 1:
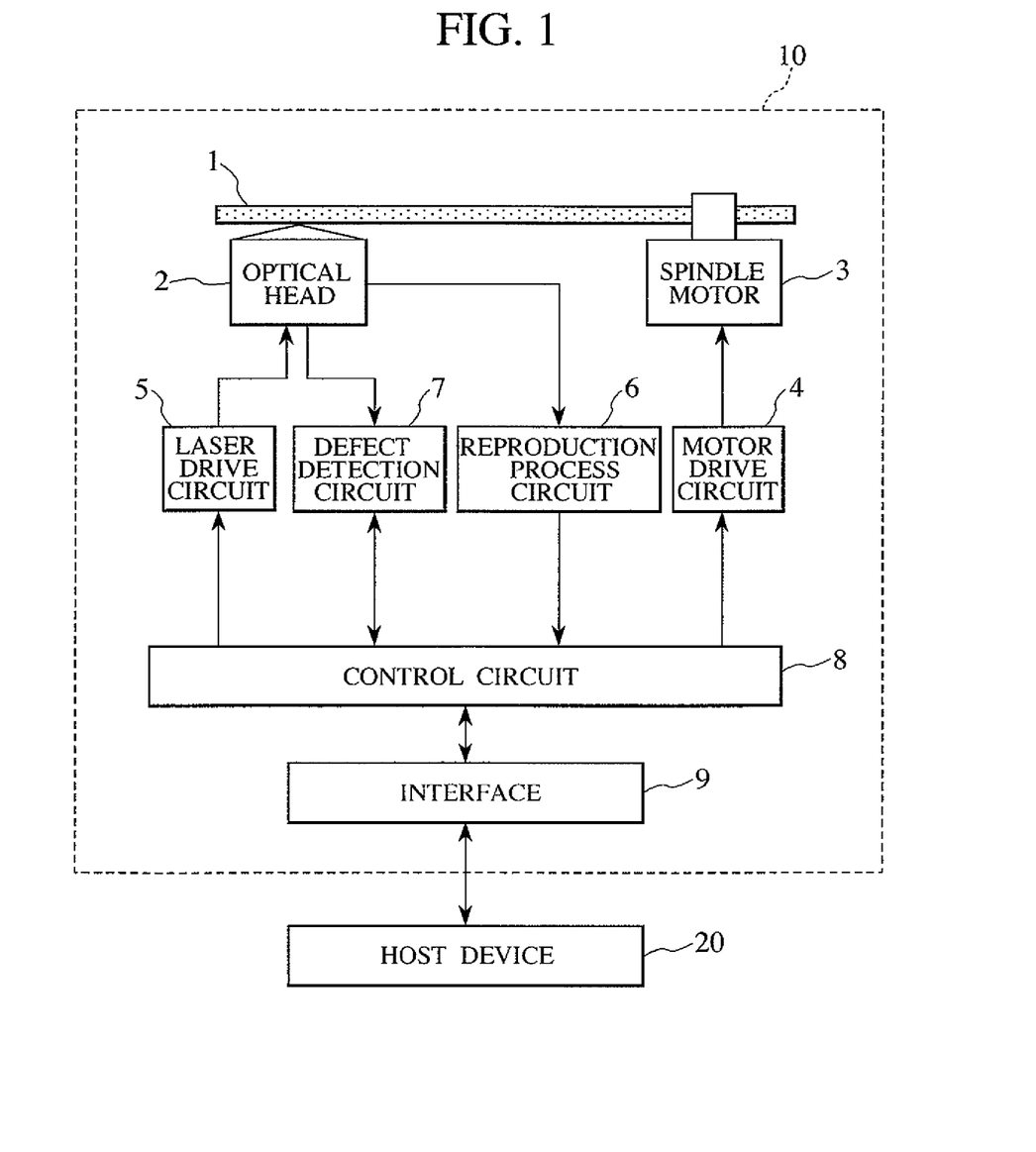
FIG. 1 is a diagram illustrating the configuration of an optical disc apparatus according to an embodiment of the present invention.

FIG. 1 is a diagram illustrating the configuration of an optical disc apparatus according to an embodiment of the present invention. The optical disc apparatus 10 according to the present embodiment uses a spindle motor 3 to rotate an inserted optical disc 1 and uses an optical head 2 to irradiate the recording surface of the optical disc 1 with a laser beam for the purpose of recording or reproducing data. A sled mechanism (not shown) moves the optical head 2 to a desired track position on the optical disc. A motor drive circuit 4 supplies a rotary drive signal to the spindle motor 3. A laser drive circuit 5 supplies a recording signal to the optical head 2. A signal read by the optical head 2 is processed by a reproduction process circuit 6 to obtain reproduction data. A defect detection circuit 7 detects a defect in the reproduction data. A control circuit 8 not only controls the operations of components in the optical disc apparatus, but also transfers recording data and reproduction data to a host device 20 that is externally connected through an interface 9.

In the present embodiment, the control circuit 8 exercises reproduction control by referencing a data identification flag, which is the information included in the reproduction data to indicate the type of data. More specifically, the control circuit 8 counts the number of particular flags (the number of real-time recording data flags) within one processing unit (block), compares the count against a threshold value, and determines, for control purposes, whether a normal reproduction process or a real-time reproduction (stream reproduction) process should be performed. When the defect detection circuit 7 detects defective data (a read error occurs) during normal reproduction, the control circuit 8 performs a data retry process from an alternative area on the disc. Still, when the retry process does not achieve error recovery, the control circuit 8 aborts the transfer to the host device 20. On the other hand, when a read error occurs during real-time reproduction, the control circuit 8 does not perform a retry process, but performs a later-described masking process on error-affected data and completes the transfer to the host device 20.

A reproduction control method according to the present embodiment will now be described in detail.

Figure 2A:
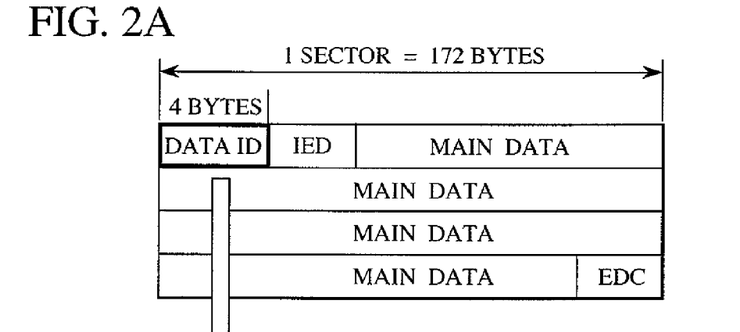
FIGS. 2A through 2C show the structure of recording/reproduction data handled by the embodiment of the present invention.
Figures 2B, 2C:
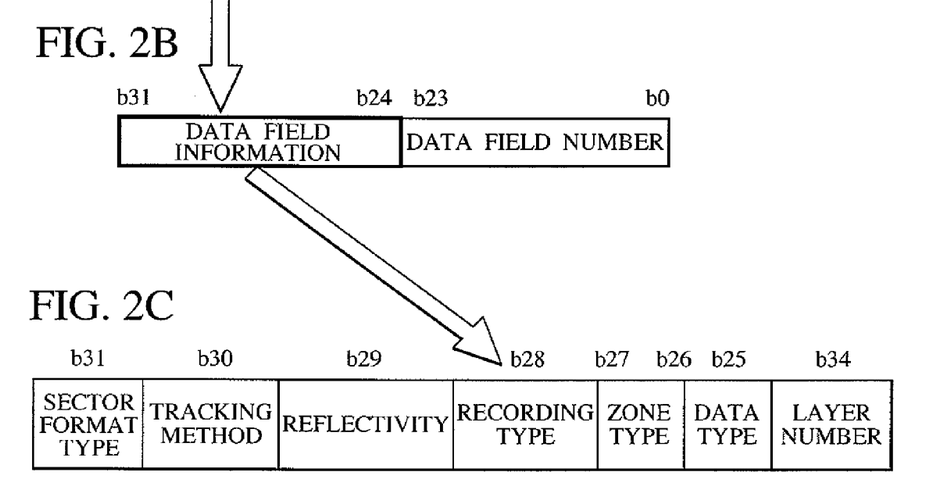

FIGS. 2A through 2C show the structure of recording/reproduction data handled by the present embodiment. This structure is defined in compliance with a file system standard, and information for identifying the type of recording data is defined as management data.

Data recording takes place on an individual block basis (for each ECC block). FIG. 2A shows the structure of a sector (Data Field, 172 bytes), which is a part of a block. A Data ID section is positioned at the leading end of the sector. Main data is stored subsequently to the Data ID section. An EDC (Error Detection Code) is positioned at the trailing end of the sector to indicate whether an error is detected in the stored data. FIG. 2B shows the structure of the Data ID section, which includes a Data Field Information section. FIG. 2C shows various pieces of management information that are included in the Data Field Information section. The information named "Recording Type" is 1-bit information that identifies the type of recording data. This information is hereinafter also referred to as the "identification flag."

According to the file system standard, the identification flag ("Recording Type") is defined as described below. In the case where the identification flag=0, it indicates a data section that is substituted by an alternative section when it is defective or indicates an area other than a data area, that is, an emboss section, and represents data that should be reproduced normally while performing a retry process as needed. On the other hand, in the case where the identification flag=1, it indicates a data section that will not be substituted by an alternative section even when it is defective, and represents data that should be reproduced in real time. The identification flag is attached to the main data in each sector.

In the past, the identification flag was referenced to exercise reproduction mode selection control by judging on an individual sector basis whether a normal reproduction process or a real-time reproduction process should be performed. Further, the EDC, which represents the result of an error check, was referenced to judge whether an error was contained. When any error was contained, the transfer of the data in the error-affected sector to the host device was aborted.

Meanwhile, the present embodiment references the identification flags in one processing unit (one block), counts the number of sectors for which the flag=1 (indicates real-time recorded data), and compares the count N against a predetermined threshold value T. When the count N is not smaller than the threshold value T, the present embodiment concludes that all the sectors of the block are filled with real-time recorded data, and reproduces the data in the real-time reproduction mode. When, on the other hand, the count N is smaller than the threshold value T, the present embodiment selectively reproduces the data in either the normal reproduction mode or real-time reproduction mode in accordance with the identification flag attached to each sector.

Figures 3A, 3B:
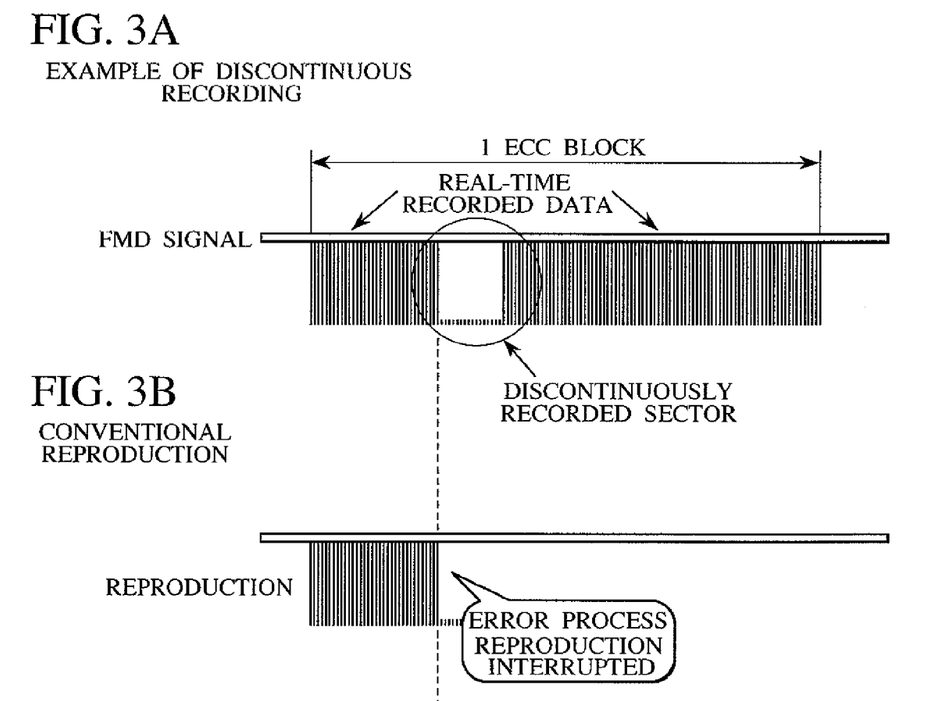
FIGS. 3A through 3C schematically illustrate discontinuously recorded data and reproduction control of such data.
Figure 3C:
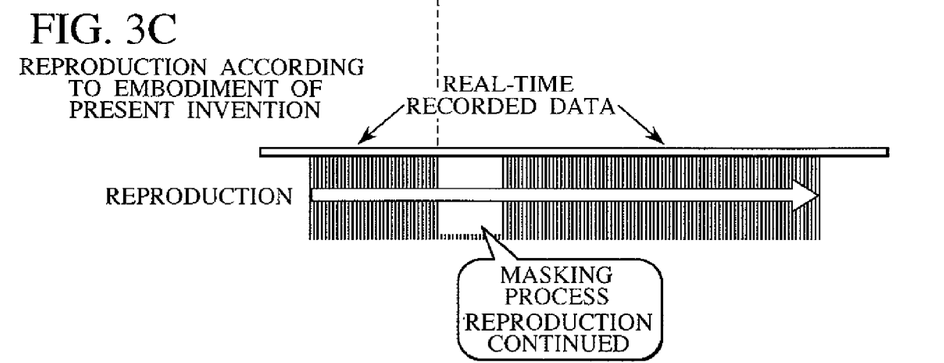

FIGS. 3A through 3C schematically illustrate discontinuously recorded data and reproduction control of such data. FIG. 3A illustrates a recording process by presenting a laser emission waveform that is detected by a front monitor diode (FMD). Recording takes place on an individual block basis (for each ECC block). If, for instance, a recording error occurs in a sector within a certain block so that real-time recording data is overwritten at a location other than the error-affected sector, the resulting recording pattern is discontinuous so that the data in the error-affected sector is missing as shown in FIG. 3A. It should be noted that a flag ("Recording Type") for distinguishing between real-time recorded data and normal recorded data is attached to each sector of recording data.

FIG. 3B shows a conventional reproduction process. In accordance with the identification flag for each sector, a real-time recorded portion (flag=1) is reproduced in real time. A portion where data is missing is reproduced normally (flag=0); therefore, if a read error occurs, a retry process is performed. When correct data is acquired as a result of the retry process, it is output to start the reproduction of the next data. However, when correct data is not acquired, the reproduction operation is aborted. Consequently, the real-time recorded data to be output without a break turns out to be discontinuous due to the reproduction process for the portion where data is missing.

FIG. 3C shows a process that is performed as described below by the present embodiment. The present embodiment references the identification flag attached to each sector within one ECC block, counts the number of sectors whose flag value is 1 (indicative of real-time recorded data), and compares the count N against a predetermined threshold value T. If, for instance, the count N=14 and the threshold value T=8 (50%) in a situation where each block is composed of 16 sectors, all the sectors are reproduced in the real-time reproduction mode because N≧T. The threshold value T is practically set to be between 2 and 8 because priority is given to real-time recorded data in consideration of data that may be discontinuously recorded. This eliminates the necessity of halting a reproduction operation in a sector whose identification flag value is 0 and makes it possible to continuously output subsequent real-time recorded data (stream data).

Even when data recorded discontinuously despite the intentions of a user is encountered, the present embodiment can output reproduction data without a break by switching to an optimum reproduction mode as described above. In addition, the present embodiment eliminates the necessity of adding a new recorder function to the optical disc apparatus because it exercises reproduction mode control by using the standardized flag ("Recording Type") that is indicative of the type of data and attached to each sector.

Two different cases where the reproduction process according to the present embodiment is performed will now be described as concrete examples. In both cases, a correction error in a portion where recorded data is missing is masked to process such a portion as real-time recorded data. In the first case, the data value of the portion where recorded data is missing, which is to be stored in a cache memory, is replaced by the value "0". In the second case, a flag for indicating whether or not to check the EDC, which is included in the data to be transferred to the host device, is used with its value changed to "0" to indicate that such a check is unnecessary.

Figure 4:
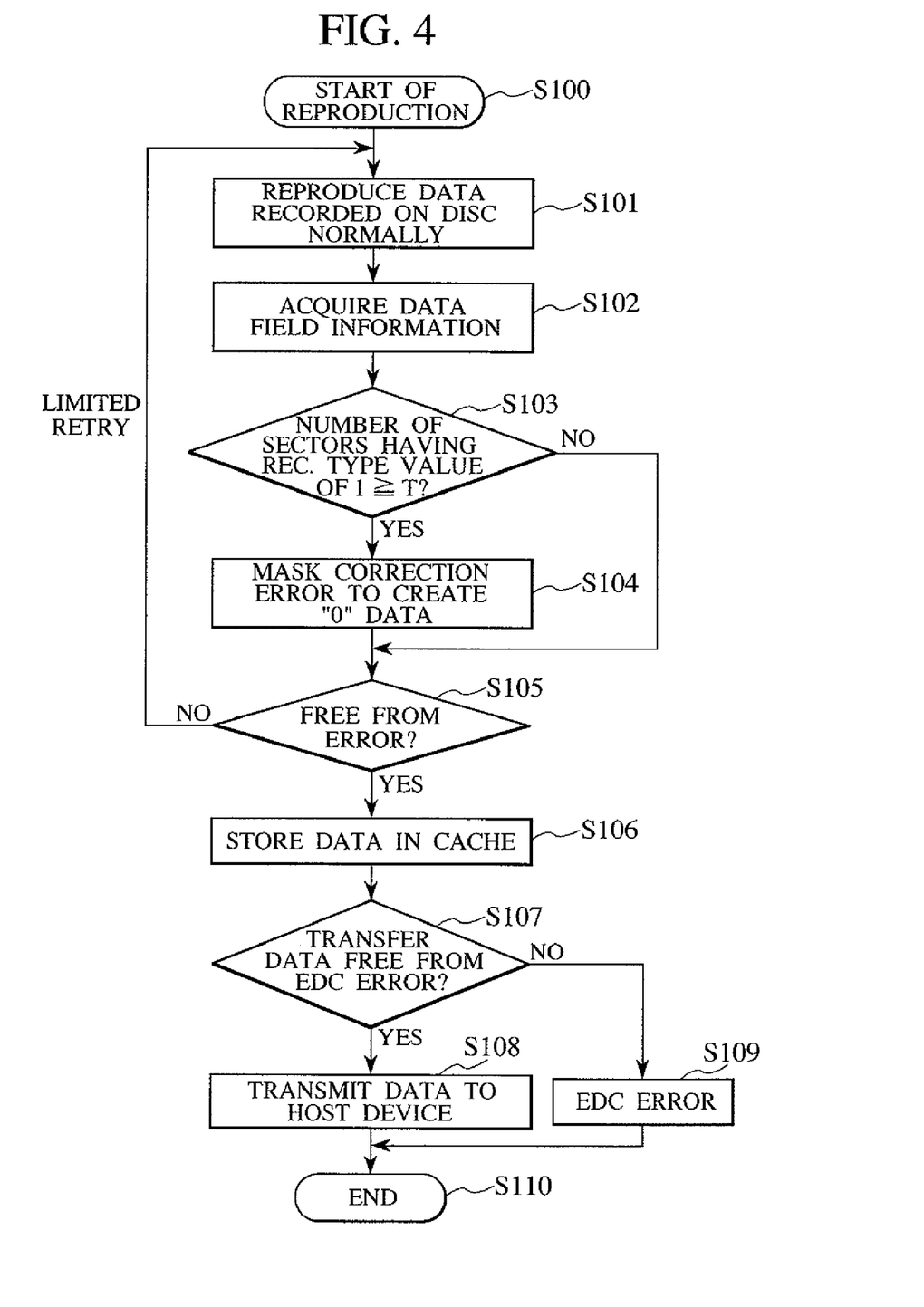
FIG. 4 is a flowchart illustrating a first case of the reproduction control process.

FIG. 4 is a flowchart illustrating the first case of a reproduction control process according to the present embodiment. A series of processing steps described below is performed upon command from the control circuit 8 after the receipt of information from the reproduction process circuit 6 and defect detection circuit 7.

Upon receipt of a data reproduction instruction in step S100, the optical disc apparatus performs step S101 to reproduce data on the optical disc normally on an individual block basis. In step S102, the optical disc apparatus accesses each sector and acquires management information, which is included in Data Field Information, in addition to main data. The optical disc apparatus then performs step S103 to obtain a Recording Type value (the value of an identification flag indicative of the type of recorded data) from the management information, count the number of sectors to which a flag value of 1 (real-time recorded data) is attached, and compare the count N derived from one block against a predetermined threshold value T.

When the count N is not smaller than the threshold value T (the query in step S103 is answered "Yes"), the optical disc apparatus proceeds to step S104 and performs a masking process on a correction error within reproduction data. The masking process is performed so as to replace the error-affected data, for instance, with the value "0". When, on the other hand, the count N is smaller than the threshold value T (the query in step S103 is answered "No"), the optical disc apparatus retains the reproduction data as is.

Next, the optical disc apparatus proceeds to step S105 and judges whether the reproduction data contains any error. When any error is contained (the query in step S105 is answered "No"), the optical disc apparatus returns to step S101 and tries to achieve error recovery by performing a retry process, for instance, from an alternative block. When, on the other hand, the reproduction data contains no error (the query in step S105 is answered "Yes"), the optical disc apparatus performs step S106 to store the reproduction data in the cache memory. In the case where the masking process was performed in step S104, the error-affected data was replaced by the value "0". Therefore, it is judged that no error is contained. Thus, the optical disc apparatus proceeds to step S106 without performing a retry process.

Next, the optical disc apparatus proceeds to step S107 and checks the EDC value of the data stored in the cache memory to judge whether the data contains any error. When the EDC value indicates that no error is contained (the query in step S107 is answered "Yes"), the optical disc apparatus proceeds to step S108 and transmits the stored data as is to the host device on an individual block basis. When the masking process was performed in step S104, the EDC value of each data indicates that no error is contained; therefore, the data can be transmitted as is to the host device. When the data is recorded normally with the EDC value of each data indicating that an error is contained (the query in step S107 is answered "No"), the optical disc apparatus proceeds to step S109, concludes that an EDC error is encountered, and terminates the reproduction control process.

Figure 5:
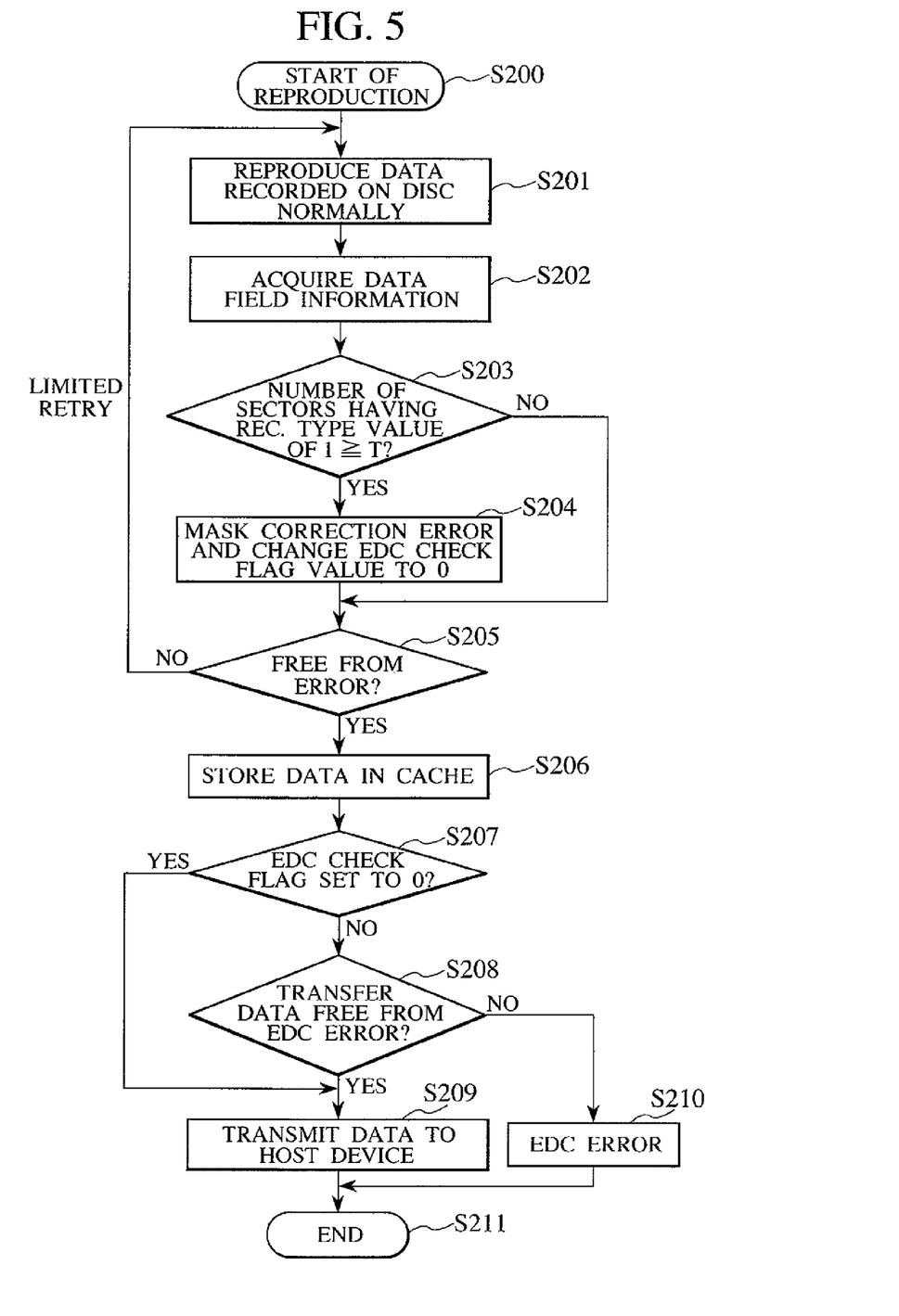
FIG. 5 is a flowchart illustrating a second case of the reproduction control process.

FIG. 5 is a flowchart illustrating the second case of the reproduction control process according to the present embodiment. Steps S200 to S203, S205, and S206 are not described because they are identical with steps S100 to S103, S105, and S106, which are shown in FIG. 4.

If the judgment result obtained in step S203 indicates that the count N is not smaller than the threshold value T, the optical disc apparatus proceeds to step S204 and performs a masking process on a correction error within reproduction data. In the masking process, a flag (EDC check flag) for indicating whether or not to check the EDC, which is included in the data to be transferred to the host device, is used with its value changed from "1", which indicates that such a check is necessary, to "0", which indicates that the check is not necessary. When, on the other hand, the count N is smaller than the threshold value T (the query in step S203 is answered "No"), the value of the flag continues to be "1" to indicate that the check is necessary.

After storing the reproduction data in the cache memory in step S206, the optical disc apparatus performs step S207 to reference the EDC check flag for the data stored in the cache memory and judge whether the value of the flag is 0 (the check is unnecessary). When the value of the flag is 0 (the query in step S207 is answered "Yes"), the optical disc apparatus proceeds to step S209 and transmits the data as is to the host device. In the case where the masking process was performed in step S204, the value of the EDC check flag for each data is 0; therefore, the stored data can be transmitted as is to the host device. Further, the host device can continue with its process without having to check the EDC value of each received data.

When the data is recorded normally with an EDC check flag value of 1 (which indicates that the check is necessary) (the query in step S207 is answered "No"), the optical disc apparatus proceeds to step S208 and checks the EDC value to judge whether any error is contained. When the EDC value of each data indicates that no error is contained (the query in step S208 is answered "Yes"), the optical disc apparatus proceeds to step S209 and transmits the data as is to the host device. When, on the other hand, the EDC value of each data indicates that an error is contained (the query in step S208 is answered "No"), the optical disc apparatus proceeds to step S210, concludes that an EDC error is encountered, and terminates the reproduction control process.

As described above, the reproduction process according to the present embodiment can output reproduced images without a break by masking any reproduction error when real-time recorded data and normal recorded data coexist due, for instance, to discontinuous recording. In addition, a high degree of practicality is achieved because a standardized identification flag ("Recording Type") can be used to select an optimum reproduction mode.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus that reproduces real-time recorded data on an optical disc, the optical disc apparatus comprising:
a spindle motor which rotates the optical disc;
an optical head which irradiates the optical disc with a laser beam to read recorded data;
a reproduction process circuit which processes a signal from the optical head to generate reproduction data;
a defect detection circuit which detects a defect in the reproduction data;
a plurality of a data identification flags, the quantity of data identification flags being dependant upon a quantity of sectors of data to be reproduced, and each data identification flag being linked to a sector of data to be reproduced; and
a control circuit which references a data identification flag indicative of a type of recorded data, controls a reproduction operation, and transfers the reproduction data to be reproduced to a host device;
wherein the control circuit accesses a target reproduction block to count the number of sectors to which the data identification flag representing real-time recorded data is attached, and when the count is not smaller than a threshold value, reproduces all the sectors of the target reproduction block, including the sectors to which the data identification flag representing real-time recorded data is not attached, in a real-time reproduction mode.

2. The optical disc apparatus according to claim 1, wherein Recording Type information included in recording data management information is used as the data identification flag.

3. The optical disc apparatus according to claim 1, wherein, in the real-time reproduction mode, the control circuit masks a portion of reproduction data that is found to be defective, changes the value of the defective data to 0 (zero), and transfers the resulting reproduction data to the host device.

4. An optical disc apparatus that reproduces real-time recorded data on an optical disc, the optical disc apparatus comprising:
a spindle motor which rotates the optical disc;
an optical head which irradiates the optical disc with a laser beam to read recorded data;
a reproduction process circuit which processes a signal from the optical head to generate reproduction data;
a defect detection circuit which detects a defect in the reproduction data; and
a control circuit which references a data identification flag indicative of a type of recorded data, the data identification flag being attached to each sector of the reproduction data, controls a reproduction operation, and transfers the reproduction data to a host device;
wherein the control circuit accesses a target reproduction block to count the number of sectors to which the data identification flag representing real-time recorded data is attached, and when the count is not smaller than a threshold value, reproduces all the sectors of the target reproduction block in a real-time reproduction mode; and
wherein, in the real-time reproduction mode, the control circuit masks a portion of reproduction data that is found to be defective, and changes the value of a flag for indicating whether or not check an EDC (Error Detecting Code), the EDC being included in the data to be transferred to the host device, to 0 (zero) to indicate that such a check is unnecessary.

5. A reproduction control method for reproducing real-time recorded data on an optical disc, the reproduction control method comprising the steps of:
referencing a data identification flag from a plurality of a data identification flags, the referenced data identification flag being indicative of a type of recorded data, the data identification flag being linked to a sector of data to be reproduced, and the quantity of data identification flags being dependant upon a quantity of sectors of data to be reproduced;
accessing a target reproduction block to count the number of sectors to which the data identification flag representing real-time recorded data is attached; and
when the count is not smaller than a threshold value, reproducing all the sectors of the target reproduction block in a real-time reproduction mode, including the sectors to which the data identification flag representing real-time recorded data is not attached.

6. An optical disc apparatus that reproduces real-time recorded data on an optical disc, the optical disc apparatus comprising:
a spindle motor configured to rotate the optical disc;
an optical head configured to irradiate the optical disc with a laser beam to read recorded data;
a reproduction process circuit configured to process a signal from the optical head to generate reproduction data;
a defect detection circuit configured to detect a defect in the reproduction data; and
a control circuit configured to: (1) reference a data identification flag from a plurality of a data identification flags, the quantity of data identification flags being dependant upon a quantity of sectors of data to be reproduced, and the referenced data identification flag being indicative of a type of recorded data and linked to a sector of the data to be reproduced, (2) control a reproduction operation, (3) transfer the reproduction data to a host device, (4) access a target reproduction block in order to count the number of sectors to which the data identification flag representing real-time recorded data is attached, and (5) when the count is not smaller than a threshold value, reproduce all the sectors of the target reproduction block in a real-time reproduction mode, including the sectors to which the data identification flag representing real-time recorded data is not attached.

7. The optical disc apparatus according to claim 6, wherein the data identification flag includes Recording Type information included in recording data management information.

8. The optical disc apparatus according to claim 6, wherein the control circuit is further configured to, in a real-time reproduction mode: (6) mask a portion of reproduction data found to be defective, (7) change to zero the value of the reproduction data found to be defective, and (8) transfer the resulting reproduction data to the host device.

9. An optical disc apparatus that reproduces real-time recorded data on an optical disc, the optical disc apparatus comprising:
a spindle motor configured to rotate the optical disc;
an optical head configured to irradiate the optical disc with a laser beam to read recorded data;
a reproduction process circuit configured to process a signal from the optical head to generate reproduction data;
a defect detection circuit configured to detect a defect in the reproduction data; and
a control circuit configured to: (1) reference a data identification flag indicative of a type of recorded data and attached to each sector of the reproduction data, (2) control a reproduction operation, (3) transfer the reproduction data to a host device, (4) access a target reproduction block in order to count the number of sectors to which the data identification flag representing real-time recorded data is attached, and (5) when the count is not smaller than a threshold value, reproduce all the sectors of the target reproduction block in a real-time reproduction mode; and wherein the control circuit is further configured to, in a real-time reproduction mode: (6) mask a portion of reproduction data found to be defective, and (7) change to zero a value of an EDC (Error Detecting Code) inspection flag, in order to indicate that it is unnecessary to conduct an inspection of an EDC (Error Detecting Code) included in the data to be transferred to the host device.

* * * * *